Dec. 5, 1950  C. J. ROMYNS  2,532,787
BOTTLE ATTACHMENT FOR MEASURING DOSES BY TIPPING
Filed Sept. 16, 1947
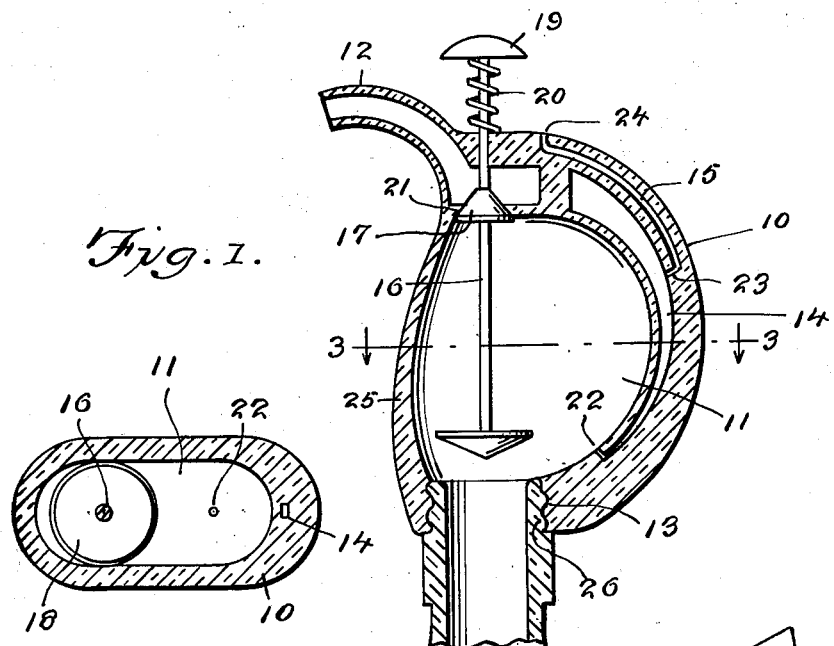
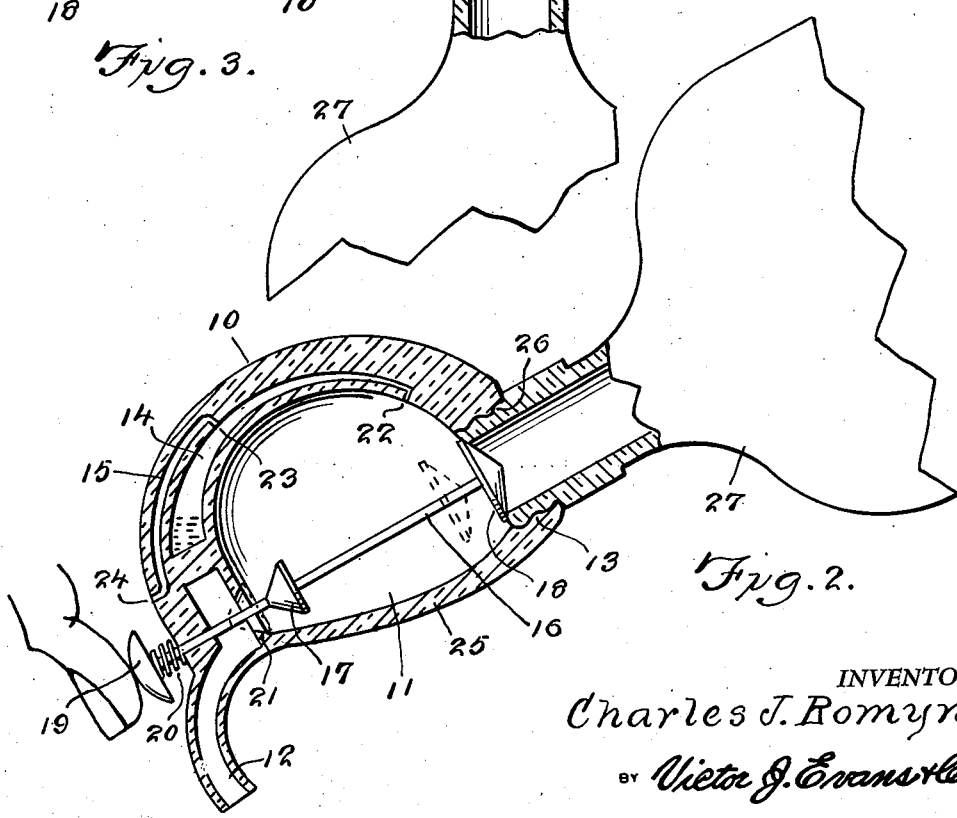
INVENTOR.
Charles J. Romyns
BY Victor J. Evans & Co.
ATTORNEYS Patented Dec. 5, 1950

2,532,787

UNITED STATES PATENT OFFICE 2,532,787

BOTTLE ATTACHMENT FOR MEASURING DOSES BY TIPPING

Charles J. Romyns, Franklin, N. J., assignor of one-half to Charles J. Fletcher, Franklin, N. J.

Application September 16, 1947, Serial No. 774,221

3 Claims. (Cl. 222—453)

This invention relates to measuring dispensing devices particularly as used on bottles or other containers wherein it is desired to pour measured quantities of liquid from the container, and in particular the invention relates to a relatively small casing having a spout with a spring actuated valve therein and in which a combination of bleeder openings similar to pin holes are provided to break the vacuum in a container without permitting leakage while pouring liquid from the container.

The purpose of this invention is to provide a small device that may be placed on the neck of a bottle for measuring quantities of liquid as it is poured from the bottle in which means is provided for obtaining smooth pouring of the liquid.

Various devices have been provided for measuring liquid as it is poured from a bottle or container but the usual device of this type does not provide means for permitting air to flow into the bottle to replace the liquid and therefore gurgling results, and where vents are provided liquid leaks through the vent. With this thought in mind this invention contemplates a dispenser for bottles and the like wherein air is admitted through apertures in a series of overlapping inner chambers so that liquid leaking from one chamber is arrested in another, and then drains back into the bottle after the dispenser is used.

The object of this invention is, therefore, to provide means in a measuring dispenser for bottles and the like that permits air to flow into the bottle as liquid is poured therefrom without permitting leakage of the liquid.

Another object of the invention is to provide a measuring liquid dispenser in which substantially all of the liquid drains from the dispenser as liquid is used therefrom.

Another object of the invention is to provide a measuring dispenser for bottles and the like that seals the bottle when not in use.

A further object of the invention is to provide a measuring dispenser for liquids which is of a simple and economical construction.

With these and other objects in view the invention embodies the features of construction, combination and arrangement of parts as will be hereinafter more fully described and illustrated in the accompanying drawing, which shows the preferred embodiment of the invention, and pointed out in the claims appended hereto.

In the accompanying drawings:

Figure 1 is a vertical section through the dispenser with part of a bottle shown in combination therewith and with parts of the bottle broken away.

Figure 2 is a similar section showing the device in use, and with the valve therein closed.

Figure 3 is a section on line 3—3 in Figure 1.

Referring now to the drawings wherein like reference characters indicate corresponding parts the dispenser of this invention includes a casing 10 having a measuring compartment 11 therein with a spout 12 at one end and a threaded opening 13 at the other, and one side of the casing is provided with a leakage chamber 14 and an air passage 15.

A valve stem 16 is slidably mounted in the casing and the stem is provided with valve members 17 and 18, that are positioned in the compartment 11, and a button 19 is provided on the outer end with a spring 20 between the button and casing urging the button outward with the valve member 17 against a seat 21, as shown in Figure 1, wherein the dispenser is substantially closed.

An aperture 22 is provided between the leakage chamber 14 and the compartment 11, and another aperture 23 is provided between the chamber 14 and the air passage 15. The aperture 23 is positioned substantially midway of the length of the chamber 14 and at the inner end of the air passage and another aperture 24 is provided at the end of the air passage. It will be noted in Figure 2 that the device is inverted in use and any leakage through the aperture 22 will accumulate in the larger end of the chamber 14 so that the passage of air into the bottle will not be obstructed.

The under side 25 of the casing is sloped so that substantially all liquid in the compartment 11 will drain through the spout.

With the parts arranged in this manner the dispenser may be screwed on the end of a neck 26 of a bottle 27, or attached to a container by any suitable means, and with the parts in the position shown in Figure 1, the measuring compartment 11 may be filled from the bottle by tilting the bottle and then the valve stem may be pressed inward so that the valve member 18 will seat against the end of the bottle and the valve member 17 will move away from the seat 21 so that the liquid in the compartment 11 may be poured from the dispenser. The bottle may then be returned to the upright position and the button 19 released so that the upper valve will be closed and the lower valve open. Any liquid that may have leaked into the chamber 14 will then drain back into the bottle.

It will be understood that modifications may be made in the design or arrangement of the parts without departing from the spirit of the invention.

What is claimed is:

1. In a measuring dispenser, a comparatively small casing having a compartment therein with a spout at one end and means attaching the casing to a bottle or the like at the other, a valve stem aligned with the bottle attaching means having a valve member on the end thereof adapted to close against the end of a bottle to which the casing is attached, said valve stem having another valve member adapted to close against a valve seat in the end of the casing carrying the spout, said valve stem projecting beyond the end of the casing and having a button thereon, a spring between the button and casing urging the valve stem outward to close the valve adjacent the spout, said casing having a leakage chamber therein extended from a point near the spout to a point in the compartment of the casing bypassing the valve adjacent the spout and means admitting air to the interior of the casing through the said leakage chamber.

2. A measuring dispenser having a threaded bottle neck receiving opening in one end with a spout at the opposite end, an inlet valve positioned to seat against the end of the bottle, an outlet valve positioned adjacent the spout, means actuating the valves from the exterior of the casing, and means urging the valves to positions closing the outlet valve and opening the inlet valve, said casing having overlapping air inlet passages positioned to drain from a point spaced from the spout into the dispenser at a point between the valves after the dispenser is used.

3. A dispenser having a measured compartment with a substantially flat side and a bulging side and having a spout at one end with a threaded bottle neck receiving opening at the other, said compartment having an arcuate leakage chamber in the bulging side with an aperture providing communicating means between the chamber and compartment and having an air passage from a point intermediate of the ends of the leakage chamber to a point adjacent the end of the compartment on which the spout is positioned, an inlet valve positioned to coact with the end of a bottle in the threaded opening, an outlet valve adjacent the spout, and means actuating the valves.

CHARLES J. ROMYNS.

REFERENCES CITED

The following references are of record in the file of this patent:

UNITED STATES PATENTS

| Number | Name | Date |
| --- | --- | --- |
| 1,260,334 | Cordley | Mar. 26, 1918 |
| 2,248,958 | Christensen | July 15, 1941 |